(12) United States Patent
Steinich

(10) Patent No.: US 9,429,587 B2
(45) Date of Patent: Aug. 30, 2016

(54) SENSOR WITH LASER WELDED COVER

(75) Inventor: Klaus Manfred Steinich, Zorneding / Pöring (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 1013 days.

(21) Appl. No.: 13/169,750

(22) Filed: Jun. 27, 2011

(65) Prior Publication Data

US 2012/0001623 A1 Jan. 5, 2012

(30) Foreign Application Priority Data

Jul. 2, 2010 (DE) .................. 20 2010 009785 U

(51) Int. Cl.
 *G01P 1/02* (2006.01)
 *G01D 11/24* (2006.01)

(52) U.S. Cl.
 CPC ............. *G01P 1/026* (2013.01); *G01D 11/245* (2013.01)

(58) Field of Classification Search
 CPC .... G01D 11/245; G01D 11/24; G01D 11/30; G01P 1/023; G01P 1/02; G01P 1/026; G01N 27/4078
 USPC ............................... 73/431, 428; 324/207.25
 See application file for complete search history.

(56) References Cited

U.S. PATENT DOCUMENTS

| 4,392,375 | A  | * | 7/1983 | Eguchi et al. .............. 73/114.36 |
| 7,391,203 | B2 | * | 6/2008 | Modest ....................... 324/207.2 |
| 2005/0101161 | A1 | * | 5/2005 | Weiblen et al. ................ 439/37 |
| 2006/0132126 | A1 | * | 6/2006 | Braun et al. .................. 324/260 |
| 2007/0151322 | A1 | * | 7/2007 | Steinich ......................... 73/1.75 |
| 2008/0164866 | A1 | * | 7/2008 | Steinich et al. ........... 324/207.2 |
| 2009/0056442 | A1 |   | 3/2009 | Tokuhara |
| 2009/0107236 | A1 | * | 4/2009 | Lohr et al. ...................... 73/431 |
| 2010/0175921 | A1 | * | 7/2010 | Buyukbas et al. ............. 174/520 |
| 2014/0069187 | A1 | * | 3/2014 | Ranftl et al. ................... 73/431 |

FOREIGN PATENT DOCUMENTS

| DE | 10207777 | 9/2003 |
| DE | 102004028818 | 1/2006 |
| DE | 112005002972 | 10/2007 |
| DE | 102008051126 | 5/2009 |
| DE | 102008042091 | 6/2009 |
| DE | 102008003340 | 7/2009 |
| DE | 102008064132 | 9/2009 |
| DE | 102009016298 | 10/2009 |
| DE | 102009001419 | 12/2009 |
| DE | 102008063691 | 6/2010 |
| DE | 102009000427 | 7/2010 |
| DE | 202009006417 | 10/2010 |
| DE | 102010001493 | 8/2011 |
| DE | 102010039627 | 2/2012 |
| DE | 112005001229 | 9/2012 |
| JP | 5141996 | 2/2013 |

* cited by examiner

*Primary Examiner* — Hezron E Williams
*Assistant Examiner* — Marrit Eyassu
(74) *Attorney, Agent, or Firm* — Head, Johnson & Kachigian, P.C.

(57) ABSTRACT

In order to configure a housing of a sensor, in particular of an angle sensor, long term leak tight in the best way possible a cover is not glued into the pot shaped housing or screwed in and sealed, but welded in the housing through a laser. In spite of the sensor chip already being in the housing, the heat induction is so small that the sensor chip is not damaged even though the sensor chip is very small.

13 Claims, 2 Drawing Sheets

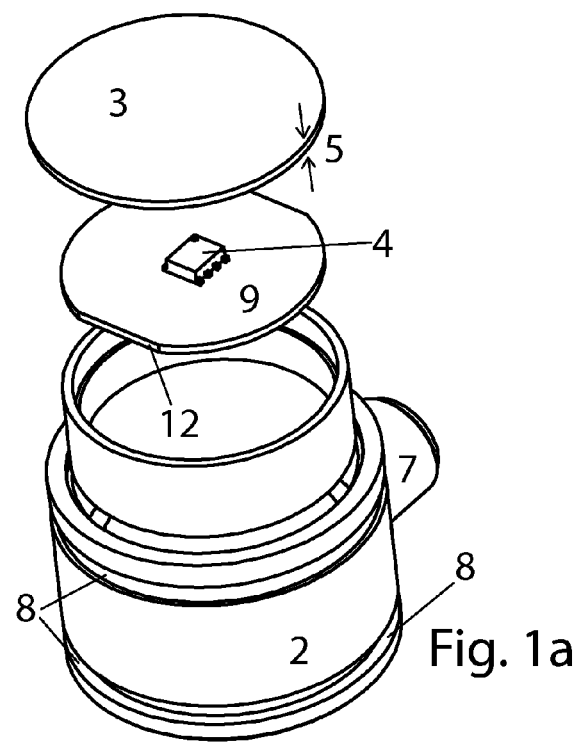
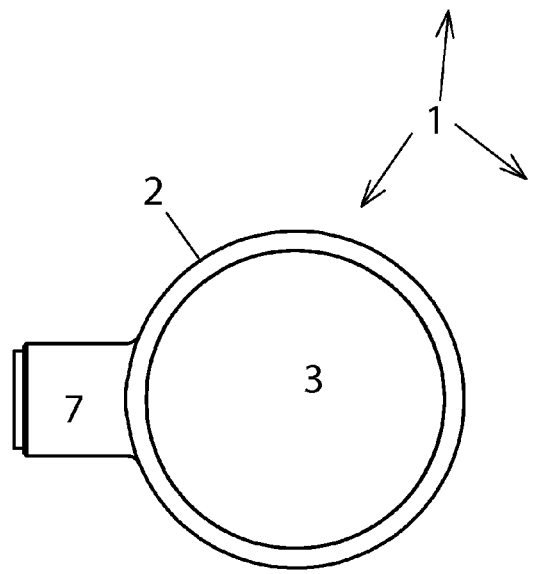
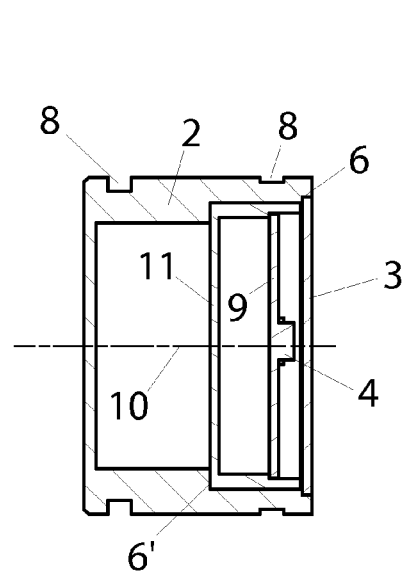
Fig. 1a
Fig. 1b
Fig. 1c

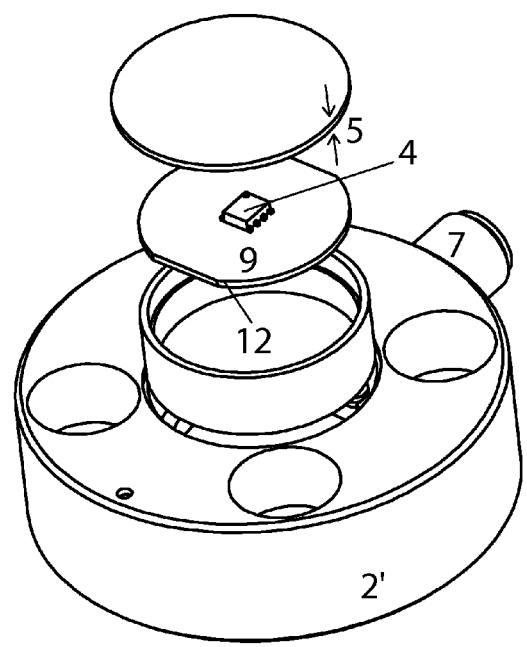
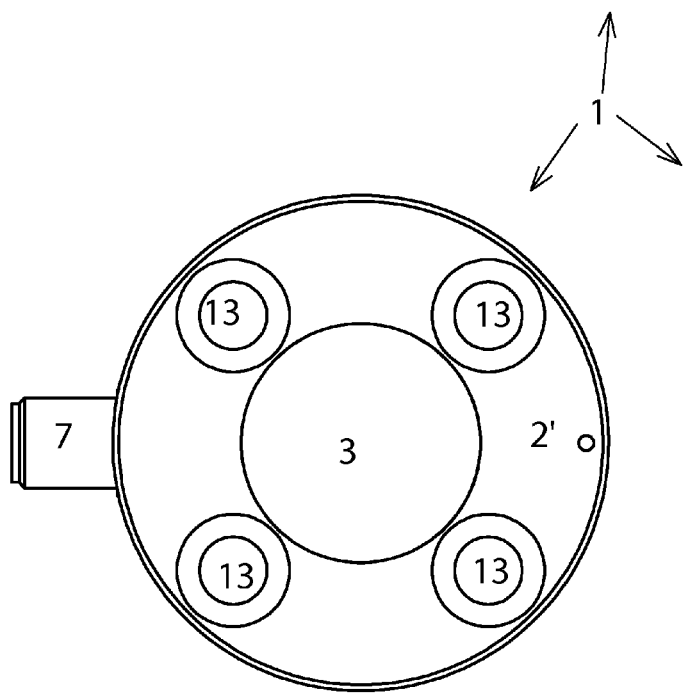
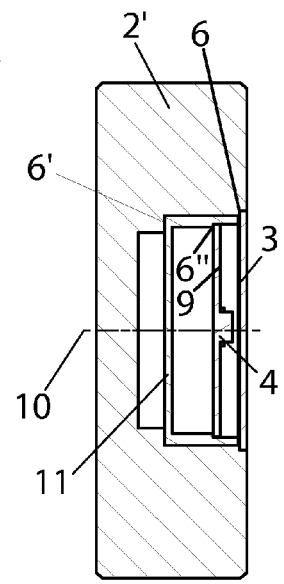
Fig. 2a
Fig. 2b
Fig. 2c

SENSOR WITH LASER WELDED COVER

I. FIELD OF THE INVENTION

The invention relates to sensors.

II. BACKGROUND OF THE INVENTION

Sensors, in particular angle sensors determine an actual position of a component to be monitored, e.g. an angle position and emit this in the form of an electrical signal for further processing.

In magnetic field sensitive sensors a sensor element typically includes an integrated electronic circuit in the form of a chip which can measure the pole orientation of a magnetic field, wherein the sensor element is disposed within an area influenced by the magnetic field.

Accordingly, the sensor element is disposed in a tight housing from which only a cable is run out for putting out signals, whereas a magnet configured as an encoder element is arranged on a component to be detected, e.g. a rotating shaft outside of the housing and opposite to the sensor element.

Since applications of this type often take place under rough environmental conditions like high pressure, high temperature, and aggressive chemicals or similar, the service life of a sensor typically does not depend from the service life of the actual sensor element, but the service life depends from the amount of time during which the housing surrounding the sensor element remains tight. As soon as the housing develops a leak, humidity penetrates towards the sensor element and causes erroneous measurements, short circuits or a destruction of the sensor element or of its connections.

For this reason, it was attempted in the past in various ways to keep the housing surrounding the sensor element tight over a time period that was as long as possible. Thus, typical sealing measures like e.g. threading two housing components together through a seal inserted there between, e.g. an O-ring were attempted like also non-disengagable sealing of a housing in that two housing components e.g. housings and covers were glued together.

However, glue joints can also disengage again depending on the prevailing temperature and depending on chemical properties of surrounding media.

Besides that attempts were also made to keep the number of contact points of the housing to be sealed as low as possible.

Additional measures were encasing the sensor element with a hardening encasement compound in simple cases instead of a surrounding stable housing, typically, however, the encasement was performed in addition to the stable housing in the interior of the housing.

III. DESCRIPTION OF THE INVENTION a) Technical Object

Thus it is the object of the invention to provide a housing for a magnetic field sensitive sensor which is safely sealed in an optimum manner for a long time.

b) Solution

The object is achieved through the features of claim 1. Advantageous embodiments can be derived from the dependent claims.

Since the cover is welded to the housing through a laser the temperature induction into the housing is so small that the sensor element which has to be mounted previously therein is not damaged and the circuit board is not damaged either on which the sensor element, typically a chip, is placed and the housing and the cover are not subject to a temperature induced warp.

In order to be able to automate the welding the best way possible and in order to be able to assure in particular an even velocity of the laser along the weld gap which avoids punctiform temperature peaks, the pot shaped housing is preferably configured rotation symmetrical and the cover is a circular disc and the welding process is performed under CNC control with a velocity that is as even as possible.

Both components are preferably made from metal, in particular the same metal, preferably a non-magnetizable metal so that the magnetic field of an encoder magnet positioned outside of the housing can permeate the cover without problems towards the sensor element arranged in the housing. For this purpose and in order to make the housing stable, the cover is much thinner than the wall thickness of the surrounding pot shaped housing and thus in particular at the most $1/10$ better at the most $1/20$ of the maximum wall thickness of the pot shaped housing, in absolute terms at the most 1.5 mm, better at the most 1.0 mm, better 0.5 mm.

In order to exactly perform the welding method the cover contacts a shoulder in an interior circumference of the pot shaped housing before welding for the purpose of positioning, in particular a circumferential shoulder. This shoulder protrudes radially inward at least by the amount of a single cover thickness, better by twice the amount of the cover thickness, even better by three times the amount of the cover thickness from the wall of the pot shaped housing.

The sensor element 4 is positioned in the interior of the pot shaped housing as close as possible to the cover to be welded, but not contacting the cover and arranged at a distance of 5 mm from the cover in axial direction 10 of the pot shaped housing.

Thus, the housing is tight after the cover is welded on, besides the cable outlet as a single additional opening, wherein the cable outlet is required for running out the signals when there is no wireless connection from the interior of the housing to the outside. The cable outlet, however, can be carefully sealed or glued in and reduces the probability of leaks compared to a larger number of locations to be sealed.

In order to further assure that the heat impact does not damage the sensor element the circuit board on which the sensor element is arranged does not directly contact a shoulder in an inner circumference of the housing but contacts a shoulder of an intermediary pot which in turn contacts a shoulder in an inner circumference of the housing.

This intermediary pot can be made from metal or also from a temperature resistant plastic material which minimizes the heat conduction from the welding location to the sensor element even better.

In order to assure a rotationally fixated positioning of the sensor element which is typically configured as a chip and fixated on a circuit board, the circuit board is arranged in a form-locking manner rotationally fixated in the intermediary pot and the intermediary pot in turn is disposed in a form-locked or friction-locked manner rotationally fixated in the housing.

At its outer circumference the housing includes at least one circumferential groove or shoulder in an outer enveloping surface, wherein the groove or shoulder can be used for attaching the housing at an enveloping component through clamping brackets.

For simple and precise production the housing is preferably produced as a turned component, the cover, however, is produced as a stamped component.

c) Embodiments

Embodiments of the invention are subsequently described in more detail with reference to drawing figures, wherein:

FIG. 1 illustrates a sensor with external grooves; and

FIG. 2 illustrates a sensor with attachment bore holes.

FIGS. 1 and 2 illustrate two different embodiments of the sensor 1, 1' respectively in an exploded view in top view and in a longitudinal sectional view, wherein the embodiments only differ with respect to their type of attachment at a surrounding component and accordingly in the shape and in the dimensions of its pot shaped housing 2, 2', while the arrangement in the interior space of the pot shaped housing 2, 2' is the same as the following:

The free space in the interior of the pot shaped housing 2, 2' is a dead hole which is open on one side and which has two annular circumferential shoulders 6, 6' that are offset in axial direction 10 in addition to the base of the dead hole.

The entire pot shaped housing 2, thus including the shoulders 6, 6' is rotation symmetrical. The cable outlet 7 which radially protrudes at one location of the circumference from the rotation symmetrical housing 2 is subsequently inserted, thus glued in or screwed in and not an integral component of the housing 2, 2'. The uppermost shoulder 6, thus the shoulder that is the closest to the face opening of the housing 2, 2' is recessed by the thickness 5 of the cover 3 from the open face. The thickness 5 of the cover 3 is much smaller than the maximum wall thickness of the housing 2, 2', typically below 1.5 mm, typically even below 1.0 mm and even below 0.5 mm.

The lower lying shoulder 6' is used for applying an intermediary pot 11 which faces the base of the dead hole of the housing 2, 2' with its base and whose circumferential wall then protrudes approximately below the cover 3 inserted into the shoulder 6.

The intermediary pot 11 is typically made from plastic material, preferably a plastic material with low heat conductivity and is preferably glued into the housing 2, 2'.

The intermediary pot 11 includes another shoulder 6'' in its inner circumference wherein the shoulder is recessed from the free end and used for placing the circuit board 9 wherein the chip shaped sensor element 4 is disposed in the center of the circuit board and faces the free open side.

While the intermediary pot 11 is rotation symmetrical on the outside like the housing, the inner circumference is not rotation symmetrical in the portion of the shoulder 6', so that a circular disc shaped circuit board 9 with a flat spot at least at one location of the circumference viewed from the top can be inserted in a form-locked and rotationally fixated manner into the intermediary pot 11 and thus a defined rotational position of the sensor element 4 is achieved relative to the housing 2, 2'.

Since the components are assembled as described and evident from FIG. 1c or 2c the welding of the cover 3 relative to the housing 2, 2' is performed along the annular circumferential gap from the face side.

The housings 2, 2' differs in that the housing 2 in FIG. 1 has a wall thickness which is just sufficient to assure the stability of the housing 2 and to assure a sufficient heat removal when welding between the cover 3 and the housing 2 and furthermore for arranging annular circumferential grooves 8 in the outer enveloping surface of the housing 2 through which the housing 2 can be attached later at an enveloping component through clamping brackets.

By comparison the wall thickness of the housing in FIG. 2 is much larger, namely big enough so that four mounting bore holes 13 can be introduced in the edge of the housing 2' radially protruding beyond the cover 3 and distributed over the circumference, wherein the mounting bore holes are openings going through in longitudinal direction 10 with a shoulder on the same axial position and for passing mounting bolts through and for bolting at another component.

REFERENCE NUMERALS AND DESIGNATIONS 1, 1' Sensor
2, 2' Housing
3 Cover
4 Sensor element
5 Thickness (cover)
6, 6', 6'' Shoulder
7 Cable outlet
8 Groove
9 Circuit board
10 Axial direction
11 Intermediary pot
12 Flattening
13 Mounting bore hole

The invention claimed is:

1. A MEM sensor, in particular an angle sensor or inclination sensor/turn-rate sensor, comprising:
   a pot shaped housing (2) with a free space in the interior of the pot shaped housing forming a dead hole, the dead hole having a first shoulder (6) and a lower lying second circumferential shoulder (6') offset in axial direction from the first shoulder (6), both protruding inward and both configured in the interior of the dead hole;
   a cover (3) closing the housing (2); and
   a magnetic field sensitive sensor element (4) inside the housing,
   wherein the cover (3) in the form of a circular disc is welded from a face side of the housing to the housing (2) through laser light, said cover having a thickness (5);
   wherein the cover (3) is inserted into the face of the pot shaped housing (2) and into the first shoulder (6), as a contact surface so that the cover (3) and the housing (2) are flush with one another on a frontal outside, wherein the first shoulder (6) protrudes radially inward at least by an amount of the thickness (5) of the cover (3);
   wherein the cover is a flat and plane parallel plate with an entire region of the cover having a constant thickness; at the second shoulder in the interior circumference, an intermediary pot made of plastic is applied which faces the base of the hole of the housing with its base and whose circumferential wall protrudes approximately below the disc shaped cover inserted into the first shoulder; and
   wherein a circuit board, on which the sensor element is arranged, contacts a shoulder in the intermediary pot.

2. The angle sensor, according to claim 1, wherein the pot-shaped housing (2) is configured rotation symmetrical.

3. The angle sensor according to claim 2 wherein the rotation symmetrical housing (2), includes at least one circumferential shoulder and/or groove (8) at its outer circumferential surfaces for attaching the housing (2) through clamping brackets at a surrounding component.

4. The angle sensor, according to claim 1, wherein the thickness (5) of the cover (3) amounts to no greater than the maximal wall thickness of the pot-shaped housing (2).

5. The angle sensor according to claim 1, wherein the thickness of the cover (3) is 1.5 mm at the most.

6. The angle sensor, according to claim 1, wherein the sensor element (4) is positioned in the pot-shaped housing (2) close to the welded cover (3), with a distance of 5 mm at the most.

7. The angle sensor, according to claim 1, wherein the housing (2) includes a cable outlet (7) as an only outward opening for conveying of the signal emitted by the sensor element (4) after the cover (3) is welded on.

8. The angle sensor, according to claim 1, wherein the cover (3) is a stamped component.

9. The angle sensor, according to claim 1, wherein the housing (2) is a turned component.

10. The angle sensor, according to claim 1, wherein the cover is a flat and plane plate with a constant thickness.

11. The angle sensor, according to claim 1, wherein the pot shaped housing comprises a free space.

12. The angle sensor according to claim 1, wherein the cover and the housing are made from the same metal.

13. A MEM sensor, in particular an angle sensor or inclination sensor/turn-rate sensor, comprising:
- a pot shaped housing (2) with a free space in the interior of the pot shaped housing forming a dead hole, the dead hole having a first shoulder (6) and a lower lying second circumferential shoulder (6') offset in axial direction from the first shoulder (6), both protruding inward and both configured in the interior of the dead hole;
- a cover (3) closing the housing (2); and
- a magnetic field sensitive sensor element (4) inside the housing,
- wherein the cover (3) in the form of a circular disc is welded from a face side of the housing to the housing (2) through laser light, said cover having a thickness (5);
- wherein the cover (3) is inserted into the face of the pot shaped housing (2) and into the first shoulder (6), as a contact surface so that the cover (3) and the housing (2) are flush with one another on a frontal outside, wherein the first shoulder (6) protrudes radially inward at least by the amount of the thickness (5) of the cover (3);
- at the lower lying second shoulder in the interior circumference, an intermediary pot made of plastic is applied which faces the base of the hole of the housing with its base and whose circumferential wall protrudes approximately below the disc shaped cover inserted into the first shoulder; and
- wherein a circuit board, on which the sensor element is arranged, contacts a shoulder in the intermediary pot,
- wherein the cover is a flat and plane parallel plate with an entire region of the cover having a constant thickness, and
- wherein the pot shaped housing comprises a free space.

* * * * *